United States Patent [19]

Hellqvist

[11] 4,001,108
[45] Jan. 4, 1977

[54] METHOD FOR NATURAL BIOCHEMICAL DECOMPOSITION OF LATRINE

[76] Inventor: Åke O. W. Hellqvist, 130 40 Djurhamn, Sweden

[22] Filed: June 23, 1975

[21] Appl. No.: 589,251

Related U.S. Application Data

[62] Division of Ser. No. 472,634, May 23, 1974, Pat. No. 3,918,106.

[30] Foreign Application Priority Data

June 14, 1973   Sweden .............................. 7308379

[52] U.S. Cl. ................................... 210/12; 210/17; 210/150
[51] Int. Cl.² .......................................... C02C 1/04
[58] Field of Search .................. 210/12, 18, 17, 15, 210/13, 60, 150, 151, 152, 167, 11, 4–8, 2; 4/10, 120, 111, DIG. 19, DIG. 12

[56] References Cited

UNITED STATES PATENTS

| | | | |
|---|---|---|---|
| 645,495 | 3/1900 | Scates | 4/120 |
| 1,056,361 | 3/1913 | Podmore | 4/120 |
| 1,751,459 | 3/1930 | Simmer | 210/11 |
| 3,487,015 | 12/1969 | Boester | 210/15 |
| 3,655,048 | 4/1972 | Pergola | 210/152 |
| 3,673,614 | 7/1972 | Claunch | 210/152 |
| 3,700,590 | 10/1972 | Burton | 210/17 |
| 3,821,107 | 6/1974 | Peoples | 210/17 |

*Primary Examiner*—Charles N. Hart
*Assistant Examiner*—Benoit Castel
*Attorney, Agent, or Firm*—Silverman & Cass, Ltd.

[57] ABSTRACT

Method for effecting the natural simultaneous biochemical decomposition of feces and urine involving the decomposition of the feces and the urine independently of each other and at different temperature but within a single apparatus. The urine is directed alone to an absorbent mineral pad and permitted to decompose as it passes slowly therethrough. The feces are mixed with a vegetable material and introduced into a separate decomposition area to a first stage where the temperature is maintained at 30° C, thereafter to a second stage where the temperature is maintained at 50° to 70° C. and thereafter to a third or final maturing stage where decomposition is completed. Excess air is introduced to the feces decomposition area during the decomposition and the feces mixture is maintained at a moisture level of 60 to 70% throughout the process, the decomposed urine being utilized to maintain the moisture level. The apparatus includes the principal chamber having at least a pair of canted planar members arranged in different planes but in a sequence, mineral wool members being carried by each of said members, said members being positioned to receive the urine and permit same to flow slowly, sequentially therethrough. The mats may be impregnated with nitrogen bacteria to aid decomposition. The feces are mixed with vegetable matter and introduced into the principal chamber, the floor of which being sloped in stages, the greater slope being at the first stage for initially receiving the mixture, the next stage being of lesser slope and the last stage being sloped in an opposite direction whereby totally defining a bowl-like configuration. The temperature within and the flow of air through the chamber is controlled.

8 Claims, 1 Drawing Figure

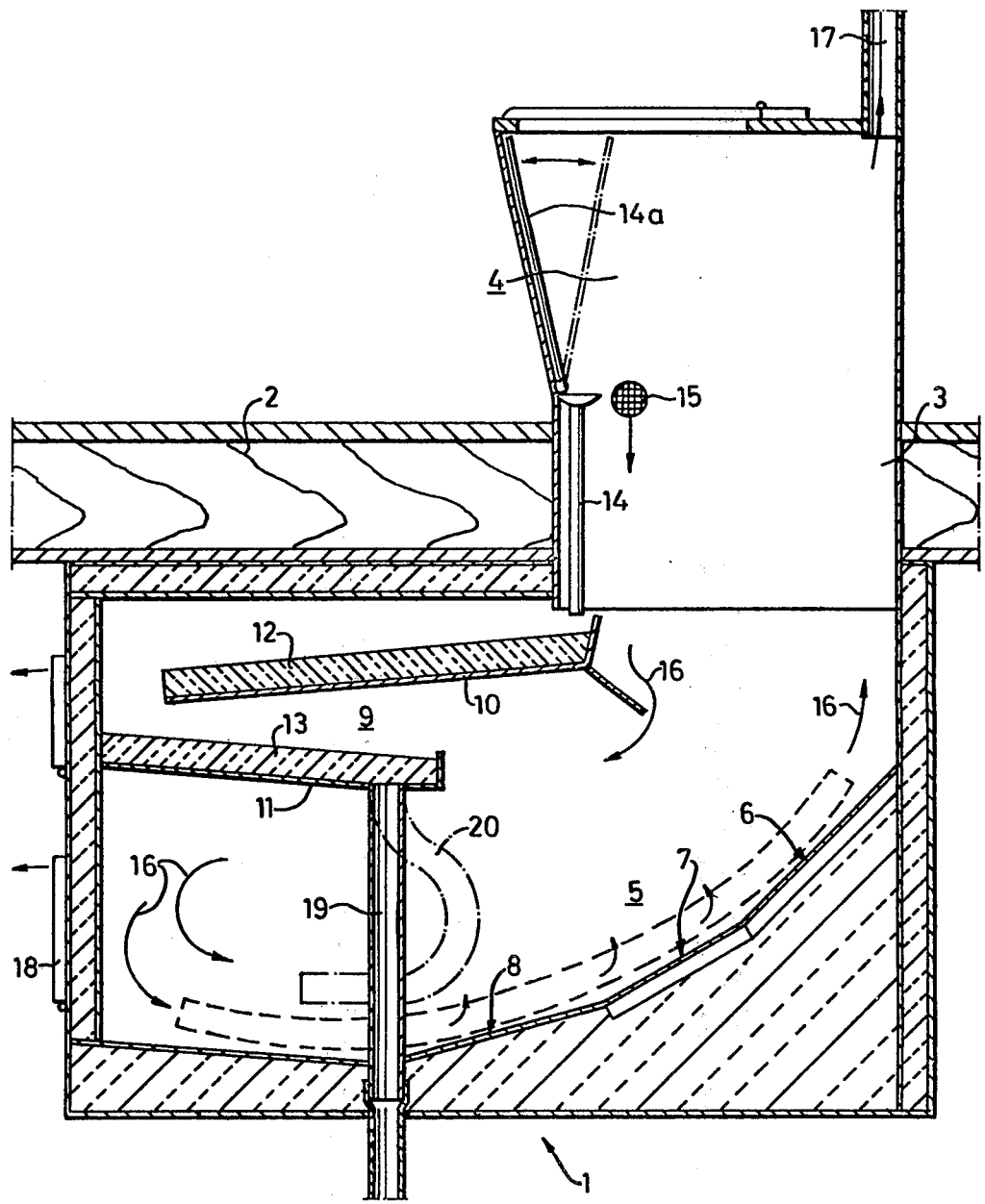

METHOD FOR NATURAL BIOCHEMICAL DECOMPOSITION OF LATRINE

CROSS-REFERENCE TO RELATED APPLICATIONS

This application is a division of co-pending U.S. patent application, Ser. No. 472,634, filed May 23, 1974 now entitled "APPARATUS FOR NATURAL BIOCHEMICAL DECOMPOSITION OF LATRINE", and now U.S. Pat. No. 3,918,106.

The present invention refers to a method for decomposing latrine in natural biochemical way. The invention is particularly suitable for toilets, but it is to be understood that the principles for the method and the apparatus may also be utilized in large compost plants for latrine and vegetable organic substances.

The classic method of handling latrine is that latrine containing feces, urine, paper, etc., is dumped or spread in the nature without biochemical decomposition. This is unsanitary and the non-decomposed latrine contains large amounts of nitrogen and bacteria which has to be transformed or decomposed before the latrine may be made use of in the nature.

An apparatus has previously been proposed in which the latrine is collected in a large container in which the latrine is collected between layers of any vegetable organic substance and in which the piled material is allowed to stay until the latrine is almost completely decomposed and has taken a character which is suitable for earth enriching. The said previously proposed apparatus gives a very good result, but the method and the apparatus are disadvantageous in some respects.

The latrine comprises a mixture of feces and urine which mixture contains large amounts of nitrogen. In order to decompose the latrine bacterially it should be foreseen that the latrine obtains a suitable relationship between carbon and nitrogen and for the biochemical decomposition of latrine it is necessary to add carbon substrates such as by adding vegetable organic substance. The urine contains an essentially larger amount of nitrogen than the feces and the urine forms an essentially larger part of the latrine than the feces, some times as large as 80 to 90 % larger. Therefore the latrine will contain a remarkable large amount of nitrogen and for the biochemical decomposition of the said nitrogen a large addition of organic vegetable substance is necessary. A plant for decomposing urine therefore must be of large dimensions and in spite of a rich addition of organic vegetable substance, the decomposition takes place rather slowly.

It is also known that the most suitable temperature for decomposing urine is +4° C while the most suitable temperature for decomposing feces is +28° to 30° C. Further the urine has some resterilizing action which acts to arrest the decomposition process.

The basis for the present invention therefore is the intention to provide a decomposition of the urine in a urine compost and a decomposition of the feces in a feces compost, whereby the urine compost and the feces compost are kept completely independent of each other at least during the largest part of the decomposition process. It has shown that the urine may to some extent provide a decomposition of its own if it is stored some time, and by making use of this decomposition of its own it is possible to substantially reduce the addition of carbon substrate. Since the feces are free from urine, a relatively small amount of carbon substrate is necessary for the decomposition of the feces. By utilizing the principles of the present invention and by utilizing the different optimum temperatures for the feces decomposition and for the urine decomposition respectively it is possible to provide a more complete and quicker decomposition of feces and urine than what is possible with biochemical decomposition of latrine and thanks to the reduced amount of carbon substrate required the dimensions of the decomposition plant may be substantially reduced compared with a known plant available for biochemical decomposition of latrine.

According to the invention the process is carried through so that urine and feces are directed to respective decomposition plants arranged parallel one relative to the other and without mixing same they are decomposed independently of each other.

The object of the process is to remove oxygen consuming material, to remove material which decays when being sedimented, to remove colloidally dissolved biochemically oxygen consuming substances called BS-substances and to reduce the amount of harmful bacteria. The invention is based on the observation that a decomposition of the urine may be accomplished without any addition of material from outside, viz, if the urine is distributed over a large surface and is allowed to stay there so long that a nitro bacteria (nitrobact) layer is built up which layer contains nitrogen consuming bacteria. When executing the method the urine is brought to distribute itself in an inactive material having a large surface, whereupon during the slow movement of the urine through the said material, the urine is decomposed by nitrogen consuming bacteria which are formed and reformed so that the urine leaving said inactive material is substantially decomposed and only contains precipitated mineral salts, etc. The ideal temperature for building up the nitrobact layer is about +4° C. The temperature in the inactive material is maintained as close as possible to said ideal temperature. As suitable inactive material may include a mat of mineral wool or similar. The compactness, the length of the mat and the inclination of the mat in relation to the horizontal plane is determinative of the time required for the urine to pass through the perforate mat, i.e., the time during which nitrobact are allowed to be formed and re-formed and thereby during which the nitrobacts are allowed to decompose the nitrogen and other constituents of the urine. In order to reduce the magnitude of the decomposition plant, it may be formed to enable the urine to pass through several mats provided in zigzag form before it leaves the plant. In order to start the urine decomposition process it may be suitable to add nitrogen consuming bacteria and in such case the mat of mineral wool or similar material may be impregnated with such bacteria before being installed.

As mentioned above, the decomposition of the feces takes place independently of the decomposition of urine, and for the decomposition of the feces, an addition of a carbon substrate is needed. Such carbon substrate may for instance be ground bark from coniferous trees or leaf trees but it is also possible to use vegetary slops etc. in order to obtain the adequate relationship between carbon and nitrogen in the feces mixture. In order to obtain a quick and good decomposition of the feces mixture, a temperature of about 30° C or more is necessary. The temperature during the very decomposition process preferably should not be more than 45° –

70° C, since in such case the evaporation of liquid will be very high and there will be a risk for drying of the feces mixture. The ideal carbon-nitrogen relationship for the decomposition is considered to be about 33 parts of carbon for 1.5 parts of nitrogen, but the relationship may be changed within fairly wide ranges. The decomposition of feces may be accomplished by an anaerobic or an aerobic process. The anaerobic process gives a very good result but is a source of unpleasant smell and it is therefore preferred to proceed with the process in aerobic way. For this purpose, an addition of air in excess is needed. The decomposition of the feces product is accomplished by mixing the carbon substrate like ground bark or putting same into layers with the feces on a feces bed where the feces mixture during the decomposition is brought to slowly move downwards. During the complete process a suitable temperature is kept. For starting the process it may be necessary to add a substantial amount of heat depending on the ambient temperature circumstances but after the process has started it goes ahead exothermically and to enable the addition of heat to be reduced or even cease.

The decomposition of the feces may take place in several different steps, for instance in three steps according to the following:

In step 1 there is basically a decomposition of the mixture of feces and carbon substrate by a transformation of nitrogen and organic substance. The decomposition takes place at a temperature of at least 35° C. Due to the exothermic reaction of the process, the temperature may sometimes become as high as 70° C. Generally this does not involve any disadvantages but there is an increased evaporation and a greater amount of liquid (water) than otherwise has to be added. A high temperature gives an increased bacterial action, and from this point of view the high temperature may be preferred. In order to effect a suitable decomposition, the percentage of moisture ought to be about 60 – 75%. If the moisture percentage becomes lower than that percentage water has to be added from outside.

In step 2 there is a continued decomposition of the mixture of feces and carbon substrate, but in this step the temperature is maintained at 50° – 70° C so that there is a pasteurizing and a killing of harmful bacteria.

Step 3 is an after-maturing step in which the mixture of carbon substrate and decomposed feces is allowed to be stationary for about 3 months. The temperature during this after-maturing step is not critical and the temperature may be allowed to fall to 25° – 30° C.

Both in step 2 and step 3 the percentage of moisture ought to be maintained and if the feces product tends to dry, liquid has to be added from outside.

The heat for the process may be applied in different ways, but suitably heat slings are mounted at the bottom of the apparatus in which the decomposition takes place. Alternatively, the heat may be added by heating the air which is necessary for the aerobic process before the air is blown over the feces mixture.

In the accompanying single FIGURE of the drawing diagrammatically illustrates an embodiment of an apparatus particularly adapted for executing the method according to the invention. Generally the apparatus comprises a decomposition or compost container 1 which is mounted under the floor 2 of a house. The container 1 has a collar 3 projecting through the floor which is provided with a toilet chair 4 or similar. The lower part of the decomposition container 1 is provided with a feces decomposition bed 5, which slopes downwards from the point where feces and carbon substrate are supplied to a place close to the opposite end of the container, i.e., the front where the bottom or floor level rises somewhat. In the illustrated embodiment, the bottom or floor is formed by three planar steps or stages corresponding to the above described three steps of the decomposition. Above the feces decomposition bed 5 there is a urine decomposition bed 9 comprising two planes or shelves 10 and 11 provided at an angle to each other. The shelves form an angle of about 10° – 20° with the horizontal plane and each carries a mat 12 and 13 respectively formed of mineral wool or any other inert material having a large surface. Depending on how long the urine is desired to be kept in the mats 12 and 13 of mineral wool the number of angularly mounted shelves or planes 10 and 11 may be changed either by increasing or decreasing said number. The angle formed by the planes 10 and 11 relative to the horizontal plane may be changed. Likewise the compactness of the mineral wool mat may be varied. For transferring the urine from the toilet chair 4 to the first one 12 of the two mineral wool mats there is a collection channel 14 at the front end of the toilet chair. In front of the collection channel 14 a rotatable disc 14a may be mounted which can take two positions, viz, one position shown in full lines in the drawing and another position shown with dotted lines. The disc 14a may be adjusted by means of a handle or a pedal in any suitable way. The urine descending through the collection channel 14 is absorbed in the first mineral wool mat 12 and slowly flows through said mat, and during this time nitrogen bacteria (nitrobacts) are formed and reformed these bacteria consuming the nitrogen of the urine. After having passed the first mineral wool mat 12, the urine flows down on the second mineral wool mat 13 and then passes through mat 13 in the same manner as it passes through the mat 12.

One or more valves are provided at the lower edge of the toilet chair for letting in air. The relatively cool air entering the apparatus flows downwards as indicated with the arrows 16 and leaves through an air outlet 17 at the rearward edge of the toilet chair 4. Air may also be directed to the feces mixture by a tube (not shown in the drawings) which with the open end thereof is located adjacent the bottom of the feces bed 5 at stage 7 or 8. Air may be supplied through said tube to the interior of the feces mixture and within this way facilitate or speed up the decomposition. A suitable distribution of air may also be obtained in the feces decomposition bed if the bed adjacent the bottom thereof is provided with one or more perforated tubes which are open at both ends and which mainly extends along the said bottom or some part thereof as indicated in the drawing.

In order to obtain the different temperatures of stage 6 and stage 7 they may be formed with electric heat slings and the said heat slings may be thermostat regulated in order to keep a correct temperature.

In order to make it possible to introduce the mineral wool mats 12 and 13 or by demand to substitute same and to empty the decomposition container from decomposed feces, doors 18 are provided at the front end of the container.

The decomposed urine leaving the urine decomposition bed 9 may be drained through a tube 19 extending through the feces bed 5 or in an alternative embodiment of the invention, the decomposed urine may be distributed over the decomposed feces mixture by means of a perforated tube 20 or similar. By this the percentage of moisture may be kept in the feces mixture during the above described after-maturing thereof.

The above described apparatus is only an illustrating example of the invention and it is obvious to the man skilled in the art that a number of alternative solutions may be presented within the scope of the appended claims.

What is claimed is:

1. A method of simultaneous decomposition of feces and urine comprising, separating and maintaining the separation of the feces and the urine from the source thereof avoiding intermixture of the feces and urine and decomposing said feces and urine separately at the same time and independent of each other at different temperatures within a single apparatus, the separation of feces and urine being maintained through the largest part of the decomposition process wherein the feces decomposition is accomplished by applying the feces in layers with a vegetary carbon substrate positioned on a sloping bed, maintaining the bed at a temperature of at least 30° C and the percentage of moisture in the feces mixture at 60 to 75%, and permitting the mixture of feces and carbon substrate to move slowly downwards along the sloping plane of the bed during the decomposition of said mixture, and wherein the urine decomposition is accomplished by flowing the urine slowly and at a relatively low temperature through a porous filter having a large total surface.

2. Method according to claim 1, in which the feces decomposition is accomplished in three stages, in which stage 1 there is mainly a decomposition at a temperature of at least 35° C, in stage 2 there is a continued decomposition and a pasteurizing at a temperature of 50° to 70° C and at stage 3 there is an after-maturing without addition from outside of heat.

3. Method according to claim 1, in which a supply of excess air is introduced during the feces decomposition.

4. Method according to claim 1, in which a nitrogen bacteria layer is built up on the surface of the filter and effects a biochemical decomposition of the urine.

5. Method according to claim 4, in which the urine is caused to flow slowly through at least one filter mounted on a sloping plane, whereby the compactness and the angle of inclination of the filter will determine the penetration speed of the urine.

6. Method according to claim 4, in which the filter is a mineral wool mat.

7. Method according to claim 4, in which the decomposed urine is utilized to maintain the percentage of moisture in the feces mixture.

8. Method according to claim 4 in which the filter is preimpregnated with nitrogen bacteria before the urine decomposition is started.

* * * * *